W. E. CRIDERMAN.
FLY TRAP.
APPLICATION FILED AUG. 17, 1908.
917,012.
Patented Apr. 6, 1909.
2 SHEETS—SHEET 1.
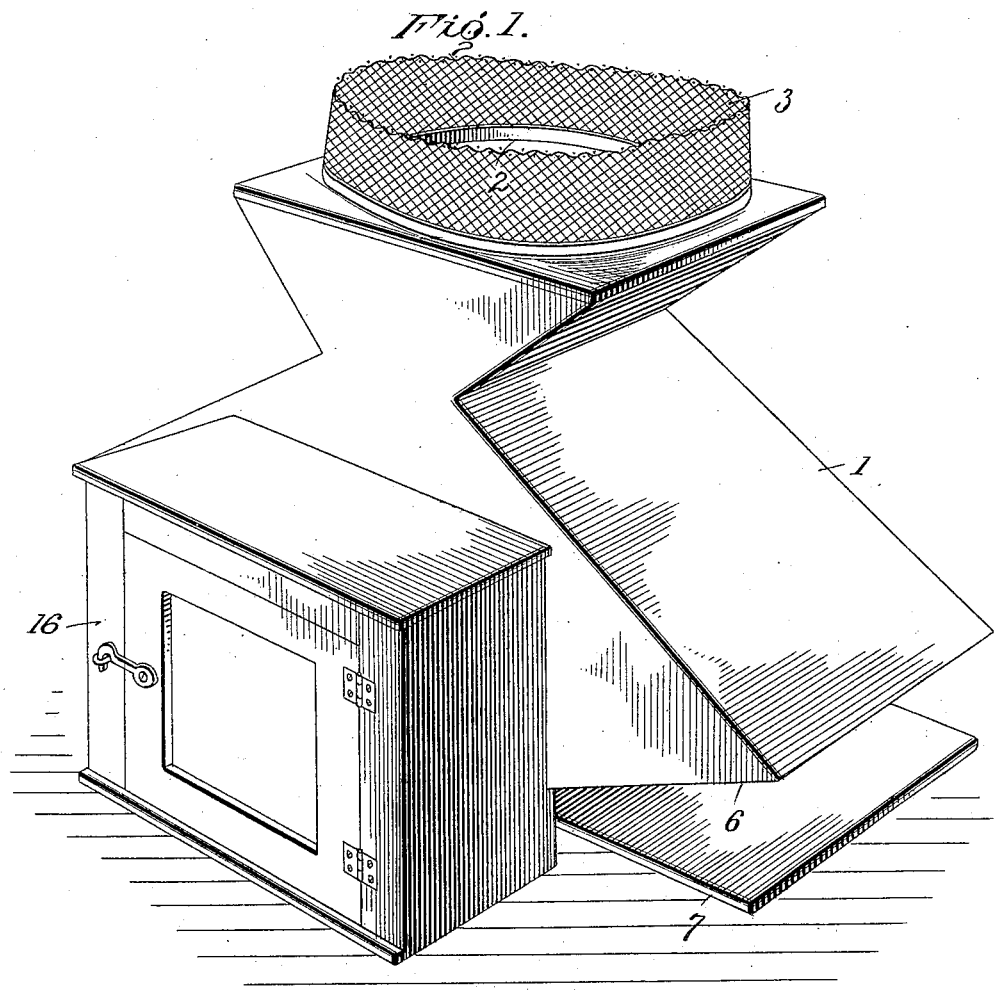
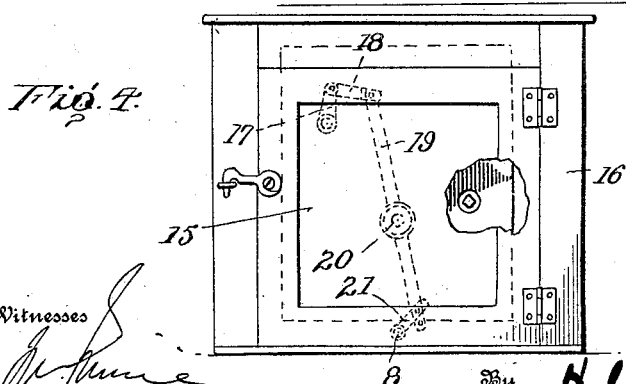
Witnesses
Inventor
W. E. Criderman
By
Attorneys

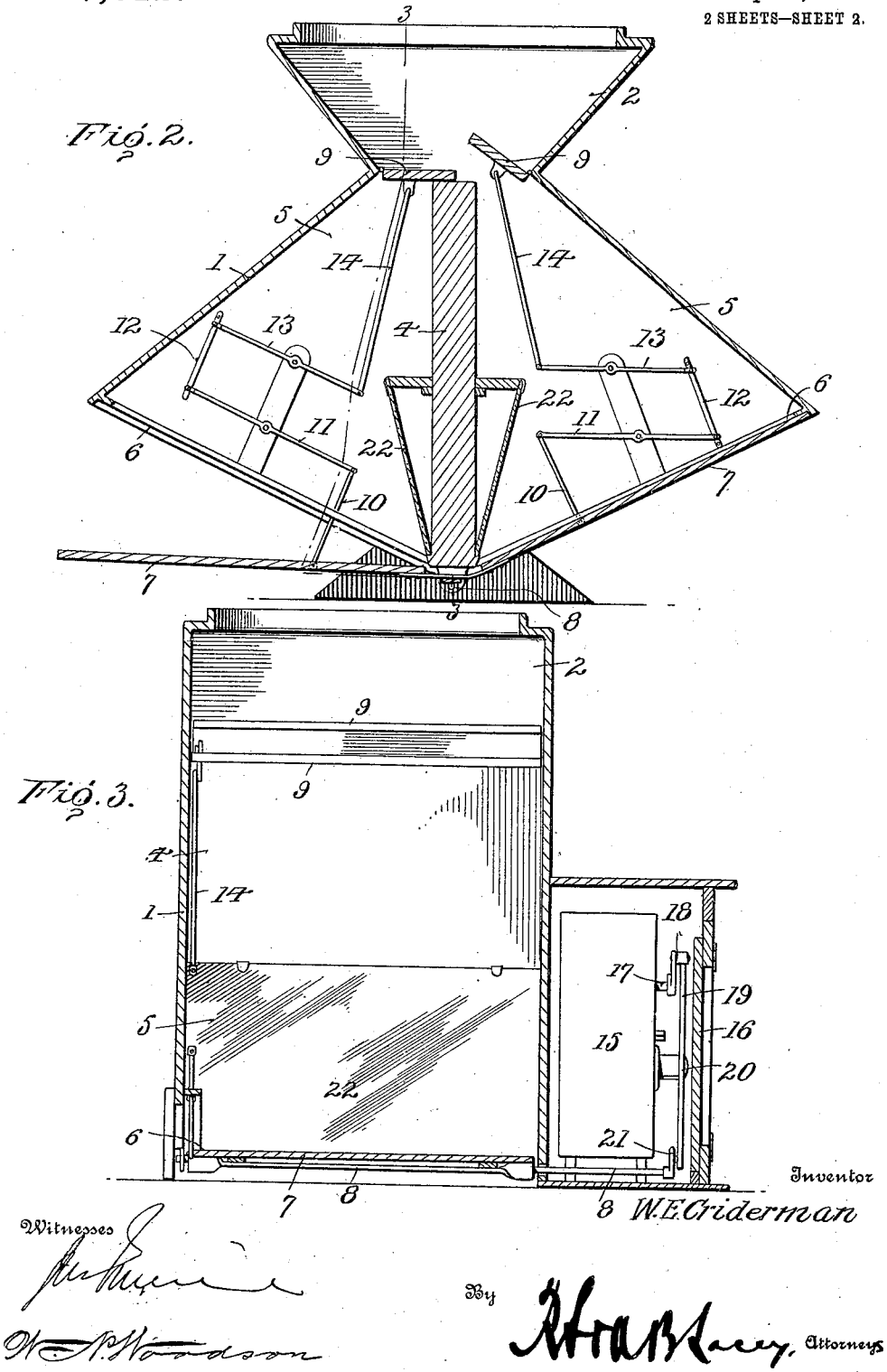

UNITED STATES PATENT OFFICE.

WILBERT E. CRIDERMAN, OF PORTLAND, OREGON.

FLY-TRAP.

No. 917,012.      Specification of Letters Patent.      Patented April 6, 1909.

Application filed August 17, 1908. Serial No. 448,998.

*To all whom it may concern:*

Be it known that I, WILBERT E. CRIDERMAN, citizen of the United States, residing at Portland, in the county of Multnomah and State of Oregon, have invented certain new and useful Improvements in Fly-Traps, of which the following is a specification.

This invention comprehends certain new and useful improvements in traps for insects, particularly flies, and the object of the invention is an improved device of this character which embodies a cage that is readily accessible to flies but from which they are prevented from escaping by peculiar means, which is susceptible of being conveniently and mechanically operated by any suitable motor, and which possesses certain other advantages that will become at once apparent as the invention is hereinafter disclosed, over the ordinary devices for catching flies such as sticky paper or poisons.

For a full understanding of the invention, reference is to be had to the following description and accompanying drawings in which:

Figure 1 is a perspective view of a fly trap constructed in accordance with my invention; Fig. 2 is a vertical longitudinal section thereof; Fig. 3 is a transverse section on the line *x—x* of Fig. 2; and Fig. 4 is a detail view of the motor and its connection with the rocking shaft.

Corresponding and like parts are referred to in the following description and indicated in all the views of the accompanying drawings by the same reference characters.

Referring to the drawings the numeral 1 designates a casing or box that is provided in its upper portion with a suitable cage 2 in which the trapped flies are confined and which, in the present instance, embodies a wire netting or screen section 3. The lower portion of this casing is divided by means of a transversely disposed partition 4 into two entrance compartments 5, the lower ends of which terminate in spaced relation to the supporting surface and are oppositely inclined as shown, and formed with entrance openings 6 extending therethrough. The respective openings 6 are designed to be controlled by doors 7 which are substantially oppositely disposed and are rigidly secured to a rocking shaft 8 that is journaled in the casing and extends transversely thereof between the openings 6, said doors being designed to be intermittingly opened and closed upon the oscillation of the rocking shaft and being so arranged that when one door is closed, the other will remain in open position so as to render the corresponding entrance compartment readily accessible to the flies or other insects to be trapped.

In order to control the communication between the respective entrance compartments and the cage to admit the insects to the latter and effectually prevent their escape therefrom, the entrance compartments are preferably upwardly tapered as shown and trap doors 9 are hingedly connected to the opposite walls of the respective compartments and are adapted to rest upon the upper end of the transverse partition 4. The respective trap doors are designed to be automatically opened by and upon the closing of the corresponding doors 7 and vice versa; and as one means for effecting this result, I equip each of the entrance compartments with a controlling mechanism embodying an actuating rod 10 that is slidingly supported upon one wall of the entrance compartment and is arranged, in the open position of the door 7, to project downwardly beyond the lower end of the entrance compartment and beyond the wall of the opening 6, into the path of the door 7. This actuating rod is pivotally connected at its upper end to one arm of a lever 11 which is fulcrumed intermediate of its ends on the corresponding wall of the entrance compartment and has its other arm connected by means of a link 12 to the corresponding arm of a second lever 13, the latter being also fulcrumed on said wall of the entrance compartment and having its other arm operatively attached to the trap door 9 through the instrumentality of a connecting rod 14. The actuating rod 10 is manifestly pushed upwardly upon the closing of the door 7 and acts in conjunction with the levers and connecting rod just described to raise the trap door 9 and thus admit light at the upper end of the entrance compartment so that any flies trapped therein will be attracted by the light, to the upper end of the entrance compartment and will pass therefrom into the cage 2, the trap door returning to closed position by gravity when the door 7 is opened, so as to prevent the possibility of any of the insects in the cage from returning through the entrance compartment to effect an escape.

The rocking shaft 8 is susceptible of being oscillated by any suitable means, and in the present instance, I employ a spring motor 15 which is mounted within a cabinet 16 that is provided at one side of the casing 1 as shown. The crank drive shaft 17 of this motor is connected by means of a link 18 to one arm of the rocking lever 19 that is fulcrumed at an intermediate point upon a suitable post 20 and has its other arm operatively connected to a crank arm 21 provided upon the adjacent end of the rocking shaft as shown, so that one complete oscillation of the rocking shaft will be effected by and upon every rotation of the drive shaft.

If necessary or desirable, in practice, any suitable means may be employed to attract the insects to the entrance compartments when the doors 7 are in open position; mirrors 22 may be provided upon opposite sides of the partition 4 at the lower end of the same for this purpose, or suitable bait may be placed upon the door 7 or any other effective means resorted to.

From the above description in connection with the accompanying drawings, it will be apparent that I have provided an improved insect trapping device in which insects are afforded ready access to the cage and are effectually prevented from escaping therefrom, which is positive in action and which is susceptible of being operated by a motor or the like so as not to require frequent attention, and which consists of comparatively few parts that may be easily and cheaply manufactured and readily assembled.

Having thus described the invention, what is claimed as new is:

1. An insect trap comprising a casing provided with a cage and with entrance compartments adapted to communicate at one end with the cage, and formed at their other ends with entrance openings extending therethrough, means for intermittingly opening and closing the entrance openings, and means for automatically controlling the communication between the respective entrance compartments and the cage so that when the entrance opening is closed, the entrance compartment will communicate with the cage and vice versa.

2. An insect trap comprising a casing provided with a cage and with entrance compartments adapted to communicate at their upper ends with the cage and formed at their lower ends with entrance openings extending therethrough, doors adapted to close the respective entrance openings, means for intermittingly opening and closing the respective doors, and means actuated by and upon the movement of the doors for automatically controlling the communication between the entrance compartments and the cage so that when the door is closed, the entrance compartment will communicate with the cage and vice versa.

3. A trap of the character described, comprising a casing formed in its upper portion with a cage and in its lower portion with entrance compartments adapted to communicate at their upper ends with the cage and having their lower ends terminate in spaced relation to the supporting surface, said entrance compartments being formed in such lower ends with entrance openings extending therethrough, a shaft journaled in the casing between the entrance openings, oppositely disposed doors rigidly supported upon the shaft and adapted to intermittingly open and close the openings upon the oscillation of the shaft, means for oscillating the shaft, and means actuated by and upon the movement of the doors for automatically controlling the communication between the entrance compartments and the cage so that when the door is closed, the entrance compartment will communicate with the cage and vice versa.

4. An insect trap of the character described, comprising a casing provided in its upper portion with a cage and in its lower portion with entrance compartments that have their upper ends adapted for communication with the cage and their lower ends terminating in spaced relation to the supporting surface and formed with entrance openings extending therethrough, a rocking shaft journaled in the casing between the entrance openings, substantially oppositely disposed doors rigidly supported upon the shaft and arranged to intermittingly open and close the respective entrance openings upon the oscillation of the shaft, a motor operatively connected to the shaft and adapted to oscillate the same, and means actuated by and upon the movement of the doors for automatically controlling the communication between the entrance compartments and the cage so that when the door is closed, the entrance compartment will communicate with the cage and vice versa.

5. An insect trap of the character described, provided with a cage and with entrance compartments adapted to communicate with the cage at their upper ends and formed in their lower ends with entrance openings extending therethrough, a rocking shaft journaled in the casing and formed at one end with a crank arm, doors rigidly supported upon the shaft and arranged to intermittingly open and close the respective entrance openings upon the oscillation of the shaft, a spring motor carried by the casing and embodying a crank drive shaft, a rocking lever operatively connected at one end to the crank drive shaft and at its other end to the crank arm of the rocking shaft, the motor being designed to oscillate the rocking shaft for the purpose specified, and means actuated by and upon the movement of the doors for automatically controlling the communication between the entrance compartments and the cage so that when the door is closed, the entrance compartment will communicate with the cage and vice versa.

6. A trap of the character described, comprising a casing provided in its upper portion with a cage, and in its lower portion with entrance compartments adapted to communicate with the cage at their upper ends and formed in their lower ends with entrance openings extending therethrough, means for intermittingly opening and closing the respective entrance openings, trap doors mounted within the upper ends of the entrance compartments and arranged to control the communication between the same and the cage, and means actuated by said first named means for operating the trap doors in the respective entrance compartments so that when the door is closed, the trap door will be opened and vice versa.

7. A trap of the character described, comprising a casing provided in its upper portion with a cage and in its lower portion with entrance compartments adapted to communicate with the cage at their upper ends and formed in their lower ends with entrance openings extending therethrough, a shaft journaled in the casing between the entrance openings, doors rigidly supported upon the shaft and arranged to intermittingly open and close the respective entrance openings upon the oscillation of the shaft, means for oscillating the shaft, upwardly opening trap doors mounted within the upper ends of the respective entrance compartments and adapted to control the communication between the same and the cage, and controlling means provided in said entrance compartments for operating the trap doors, said controlling means embodying an actuating rod loosely mounted in the entrance compartment and arranged to project beyond the wall of the entrance opening into the path of the door, and means for operatively connecting the actuating rod and trap door as and for the purpose specified.

In testimony whereof I affix my signature in presence of two witnesses.

WILBERT E. CRIDERMAN. [L. S.]

Witnesses:
J. H. PATTERSON,
THOS. I. EVANS.